United States Patent
Ozaki et al.

(10) Patent No.: US 9,404,622 B2
(45) Date of Patent: Aug. 2, 2016

(54) FILLING PORT STRUCTURE FOR PRESSURE FLUID

(71) Applicant: HONDA MOTOR CO., LTD., Tokyo (JP)

(72) Inventors: Hiroyasu Ozaki, Saitama (JP); Koichi Takaku, Saitama (JP); Taneaki Miura, Saitama (JP); Koichi Kato, Saitama (JP); Saneto Asano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 208 days.

(21) Appl. No.: 14/372,803

(22) PCT Filed: Jan. 28, 2013

(86) PCT No.: PCT/JP2013/051702
§ 371 (c)(1),
(2) Date: Jul. 17, 2014

(87) PCT Pub. No.: WO2013/115120
PCT Pub. Date: Aug. 8, 2013

(65) Prior Publication Data
US 2014/0374417 A1 Dec. 25, 2014

(30) Foreign Application Priority Data
Feb. 1, 2012 (JP) .................................. 2012-019440

(51) Int. Cl.
*F16L 37/28* (2006.01)
*F17C 13/06* (2006.01)
(Continued)

(52) U.S. Cl.
CPC .............. *F17C 13/06* (2013.01); *B60L 11/1883* (2013.01); *B60L 11/1898* (2013.01); *F16L 21/02* (2013.01);
(Continued)

(58) Field of Classification Search
CPC . F17C 13/06; B60L 11/1883; B60L 11/1898; F16L 21/02; F16L 21/03; H01M 8/04089; H01M 8/04201; H01M 2008/1095; Y02T 90/16; Y02T 90/34; Y02E 60/321; Y02E 60/50
USPC ............. 141/311 R, 346; 137/614.02–614.05
See application file for complete search history.

(56) References Cited

U.S. PATENT DOCUMENTS 3,039,794 A * 6/1962 De Cenzo ........... F16L 37/1215
137/614.03
3,424,181 A * 1/1969 Morse ..................... F16K 1/306
137/316

(Continued)

FOREIGN PATENT DOCUMENTS

CN 1682062 A 10/2005
CN 1916474 A 2/2007
(Continued)

OTHER PUBLICATIONS

Chinese Office Action application No. 201380007552.9 issued Apr. 3, 2015.
(Continued)

*Primary Examiner* — Nicolas A Arnett
(74) *Attorney, Agent, or Firm* — Squire Patton Boggs (US) LLP (57) ABSTRACT

A first fluid channel of a first body has a first inner diameter part and a second inner diameter part in an order that an inner diameter becomes smaller from a side where a nozzle is inserted. A second body has a second fluid channel capable of communicating with the first fluid channel and further has a first outer diameter part and a second outer diameter part which are inserted in the second inner diameter part in an order that an outer diameter becomes larger from the first fluid channel side. When the tip part of the second body is inserted in the first fluid channel, a wall surface provided at an end of the second inner diameter part along an axial direction, an end surface of the tip part of the second body and an inner circumferential surface of the second inner diameter part form a sealing groove.

5 Claims, 7 Drawing Sheets

(51) Int. Cl.
  *H01M 8/04* (2016.01)
  *F16L 21/02* (2006.01)
  *B60L 11/18* (2006.01)
  *H01M 8/10* (2016.01)
  *F16L 21/03* (2006.01)

(52) U.S. Cl.
  CPC ...... *H01M 8/04089* (2013.01); *H01M 8/04201* (2013.01); *F16L 21/03* (2013.01); *H01M 2008/1095* (2013.01); *Y02E 60/321* (2013.01); *Y02E 60/50* (2013.01); *Y02T 90/16* (2013.01); *Y02T 90/34* (2013.01)

(56) References Cited

U.S. PATENT DOCUMENTS

| | | | | |
|---|---|---|---|---|
| 3,592,231 | A * | 7/1971 | Lamb | F16L 37/23 137/614 |
| 4,098,292 | A * | 7/1978 | Evans | F16L 37/23 137/614.04 |
| 5,139,049 | A * | 8/1992 | Jensen | F16L 37/34 137/614.03 |
| 5,244,010 | A * | 9/1993 | Barjasteh | B60H 1/00585 137/614 |
| 5,450,875 | A * | 9/1995 | Chichester | F16L 37/413 137/614.05 |
| 5,462,084 | A * | 10/1995 | Arisato | F16L 37/30 137/614.03 |
| 5,467,806 | A * | 11/1995 | Stricklin | F16L 37/28 137/614.04 |
| 5,609,195 | A * | 3/1997 | Stricklin | F16L 37/28 137/614.04 |
| 6,116,277 | A * | 9/2000 | Wilcox | F16L 37/23 137/614 |
| 6,257,278 | B1 * | 7/2001 | Danielson | F16L 37/413 137/614.03 |
| 6,296,228 | B1 * | 10/2001 | Knowles | F25B 41/003 137/614.05 |
| 6,347,785 | B1 * | 2/2002 | Copp | B67D 1/0835 137/269 |
| 6,450,199 | B1 | 9/2002 | Haunhorst | |
| 6,539,988 | B1 * | 4/2003 | Cowan | B60H 1/00585 137/614.04 |
| 6,564,829 | B2 * | 5/2003 | Arisato | F16L 29/04 137/545 |
| 6,637,460 | B2 * | 10/2003 | Haunhorst | F16L 37/23 137/614.03 |
| 6,637,725 | B2 * | 10/2003 | Davis | B67D 1/0835 137/269 |
| 6,644,331 | B2 * | 11/2003 | Arisato | F16L 29/04 137/1 |
| 6,796,340 | B1 * | 9/2004 | Ferris | B60H 1/00585 137/614.04 |
| 6,807,976 | B2 * | 10/2004 | Knowles | F16L 37/30 137/1 |
| 2002/0179160 | A1 * | 12/2002 | Arisato | F16L 29/04 137/614.03 |
| 2002/0179875 | A1 * | 12/2002 | Davis | B67D 1/0835 251/149.6 |
| 2003/0140971 | A1 * | 7/2003 | Haunhorst | F16L 37/23 137/614.04 |
| 2010/0269956 | A1 | 10/2010 | Iida et al. | |

FOREIGN PATENT DOCUMENTS

| | | |
|---|---|---|
| JP | 50-86722 S | 7/1975 |
| JP | 2009-156371 A | 7/2009 |

OTHER PUBLICATIONS

International Search Report dated Apr. 16, 2013 corresponding to International Patent Application No. PCT/JP2013/051702 and English Translation thereof.

* cited by examiner

FILLING PORT STRUCTURE FOR PRESSURE FLUID

TECHNICAL FIELD

The invention relates to a filling port structure for pressure fluid in which a nozzle is inserted in a receptacle provided, for example, in a vehicle or a pressure fluid utilization apparatus such as a stationary type apparatus and which can fill pressure fluid such as gas.

BACKGROUND ART

Figure 7A:
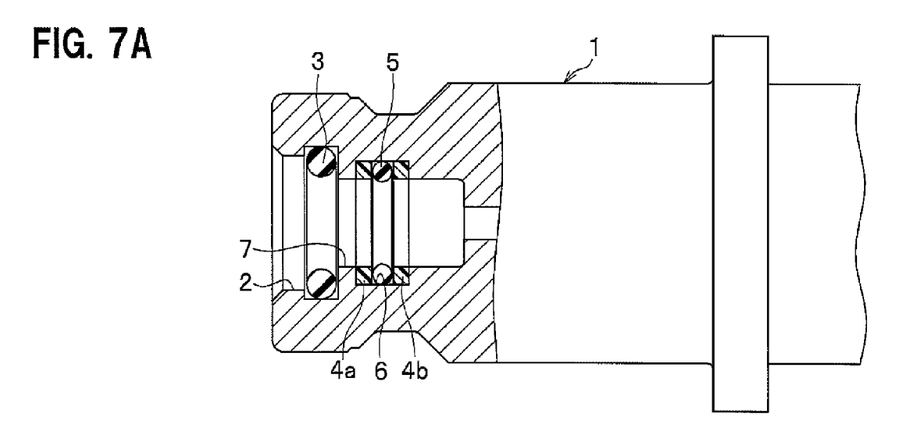
FIG. 7A is a structural cross sectional view of a hydrogen filling port for a car in 70 MPa specifications described in SAE J2799.

FIG. 7A is a structural cross sectional view of a hydrogen filling port for a car in 70 MPa specifications described in SAE J2799.

As illustrated in FIG. 7A, the hydrogen filling port has a connector structure in which seal members are arranged in a receptacle 1 as a reception side. A first O-ring 3 which has a larger diameter is assembled at an insertion port 2 side through which a nozzle (not illustrated) is inserted. Further, a pair of backup rings 4a, 4b and a second O-ring 5 are arranged at a back side apart from the insertion port 2 along a center line. The second O-ring 5 has a smaller outer diameter and is arranged between a pair of backup rings 4a, 4b.

The pair of backup rings 4a, 4b and the second O-ring 5 are assembled in a fixing groove 6 as an annular groove which has a smaller diameter than an inner diameter of the insertion port 2. Further, an annular partition 7 which projects toward an inner diameter side is formed between the first O-ring 3 and the pair of backup rings 4a, 4b, the second O-ring 5 at the back side.

Further, for example, Patent Literature 1 discloses a gas supply structure as this kind of connector structure which has a first O-ring arranged near an insertion port of a receptacle, a second O-ring arranged at a downstream side of the first O-ring, and a foreign body removal member which is arranged between the first O-ring and the second O-ring.

PRIOR ART DOCUMENTS

Patent Literatures

Patent Literature 1: JP2009-156371 A

SUMMARY OF THE INVENTION

Problems to be Solved by the Invention

In the hydrogen filling port for a car described in SAE J2799, when the pair of backup rings 4a, 4b and the second O-ring 5 are assembled respectively in the receptacle 1, the fixing groove 6 in which the pair of backup rings 4a, 4b and the second O-ring 5 are assembled is positioned at the back side of the insertion port 2. Further, the annular partition 7 having the diameter smaller than that of the fixing groove 6 is positioned at a front side of the fixing groove 6, and thereby the annular partition 7 could be an obstacle. Therefore, an assembly operation for the seal members through the insertion port 2 is bothersome and an exchange operation with new members is also bothersome. These lead to a long operation period.

In this regard, the gas supply structure disclosed in Patent Literature 1 can be applied to the same, and the assembly operation and the exchange operation through the insertion port for the second O-ring arranged at a back side are bothersome.

As a purpose of the invention in general, the invention provides a filling port structure for pressure fluid in which seal members such as O-rings can be easily assembled and can be easily exchanged.

Means to Solve the Problems

To solve the above problems, a filling port structure for pressure fluid that is provided on a pressure fluid utilization apparatus is provided. The filling port structure has a pair of a first body and a second body. The second body is formed separately from the first body. The first body includes a first fluid channel in which a nozzle is inserted from an outside of the pressure fluid utilization apparatus. The first fluid channel has a first inner diameter part and a second inner diameter part in an order that an inner diameter becomes smaller from a side where the nozzle is inserted. The first inner diameter part and the second inner diameter part have inner circumferential surfaces on which seal assembly surfaces are formed, respectively. The second body has a second fluid channel that is capable of communicating with the first fluid channel when the second body is combined with the first body, and has a second body fixing part that fixes the pressure fluid utilization apparatus and the filling port. The second body has a first outer diameter part and a second outer diameter part that have outer diameters inserted in the second inner diameter part and that are successive from a tip part in an order that a diameter becomes larger from the first fluid channel side. A wall surface that is provided at an end along an axial direction of the second inner diameter part, an end surface of the tip part of the second body and an inner circumferential surface of the second inner diameter part form a sealing groove when the tip part of the second body is inserted in the first fluid channel.

According to the invention, since the first body and the second body are formed separately, an assembly operation for the seal members on the second inner diameter part of the first body can be easily carried out. Further, an assembly property can be improved and an assembly time can be shortened.

Shortly, the inner circumferential surface of the first body is not formed as the sealing groove yet before the tip part of the second body is inserted in the first fluid channel of the first body. Therefore, the sealing members can be easily assembled on the inner circumferential surface (seal assembly surface) of the first body from an opening part side of the first body through which the tip part of the second body can be inserted. Further, after the seal members are assembled, the tip part of the second body is inserted along the first fluid channel of the first body and the first body and the second body are combined integrally. Thus, the filling port for pressure fluid is formed.

The first body preferably has a first body fixing part that positions outside the pressure fluid utilization apparatus with respect to the second body fixing part. With such a structure, for example, when the filling port structure is applied to a vehicle, an exchange operation can be carried out in an onboard state.

The first body preferably has a concave portion for engaging a tool on an outer circumference at one end side apart from the side where the nozzle is inserted. With such a structure, a specialized tool is needed to retain the concave portion for engaging the tool. Therefore, it is difficult for an end user to disassemble the first body and the second body.

The second fluid channel preferably includes a filter and a check valve that can seal the pressure fluid supplied from the first fluid channel in an order from a side adjacent to the first fluid channel. With such a structure, even when the first body is separated from the second body, the check valve prevents hydrogen gas from leaking to the outside and waste of the hydrogen gas can be avoided. Further, the check valve can be prevented from being touched by an operator carelessly when the first body is separated from the second body.

Preferably, a penetrating bore that penetrates the female screw in a radial direction is formed in the first body fixing part, and a locking member that locks the second body is provided in the penetrating bore. With such a structure, the locking member which is screwed in the penetrating bore breaks the male screw partially. A structure can be formed, in which the end user cannot disassemble the first body and the second body.

Effect of the Invention

The invention can provide a filling port structure for pressure fluid in which seal members such as O-rings can be easily assembled and can be easily exchanged.

EMBODIMENTS FOR CARRYING OUT THE INVENTION

Embodiments of the invention will be explained, referring to accompanying drawings as necessary.

For example, a fuel cell is mounted in a fuel cell automobile. A polymer electrolyte fuel cell has been known as the fuel cell. The polymer electrolyte fuel cell has an anode which is supplied with fuel gas such as hydrogen gas and a cathode which is supplied with oxidizing gas containing oxygen such as air.

The fuel cell automobile has a hydrogen gas supply system to supply the hydrogen gas to the anode. The hydrogen gas supply system has, for example, a hydrogen tank in which the hydrogen gas is stored, a hydrogen gas filling port 10 (see FIG. 1) through which the hydrogen gas is filled in the hydrogen tank, pipes which connect the hydrogen gas filling port 10 and the hydrogen tank, a valve which opens/closes a fluid channel of the hydrogen gas, a regulator which regulates pressure of the hydrogen gas, and the like. In the embodiments, the fuel cell automobile will be explained as a pressure fluid utilization apparatus. The embodiments are not limited thereto and can be applied to, for example, a stationary type apparatus (not illustrated) or the like.

Figure 1:
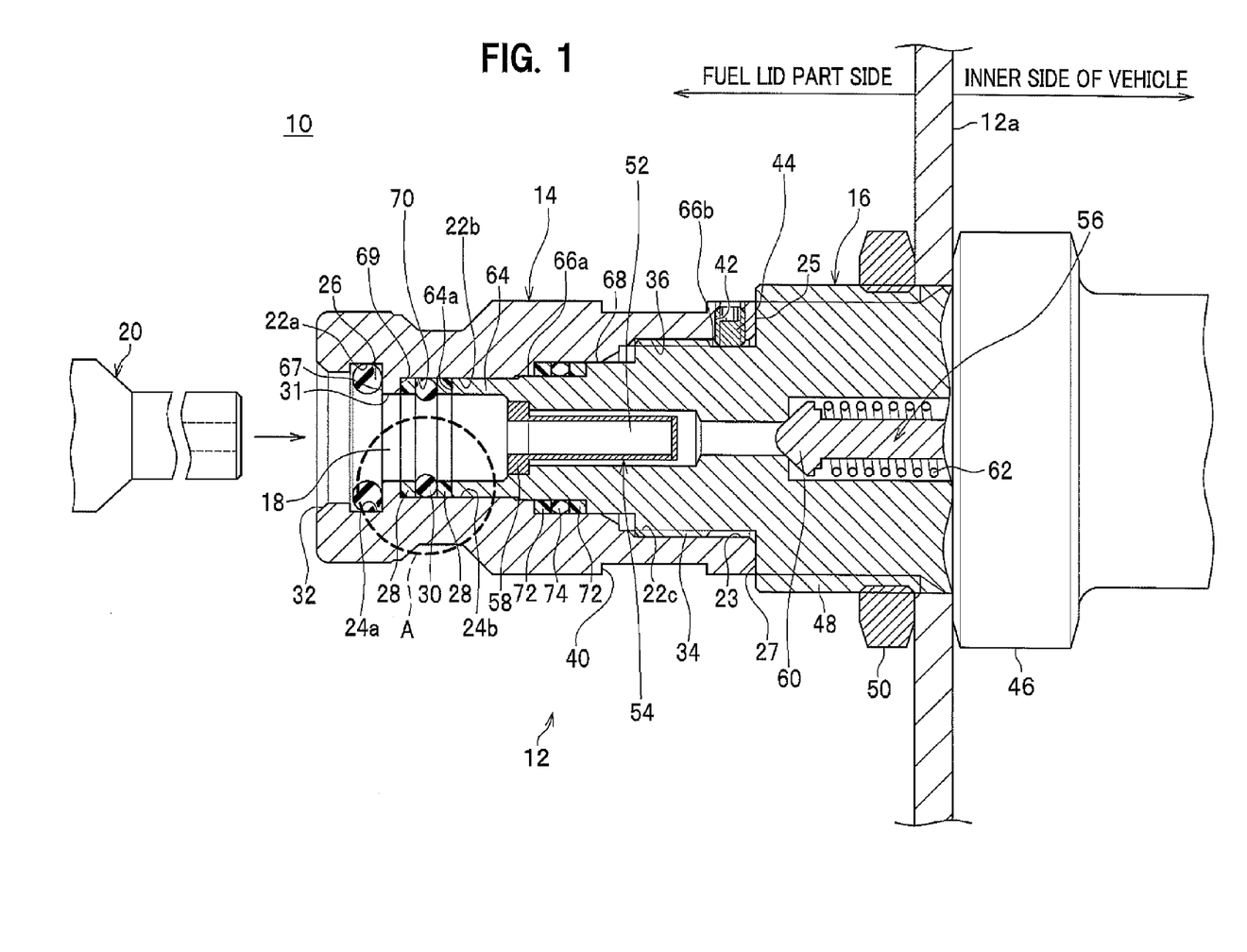
FIG. 1 is a schematic structural cross sectional view of a hydrogen gas filling port according to an embodiment of the invention.
Figure 2:
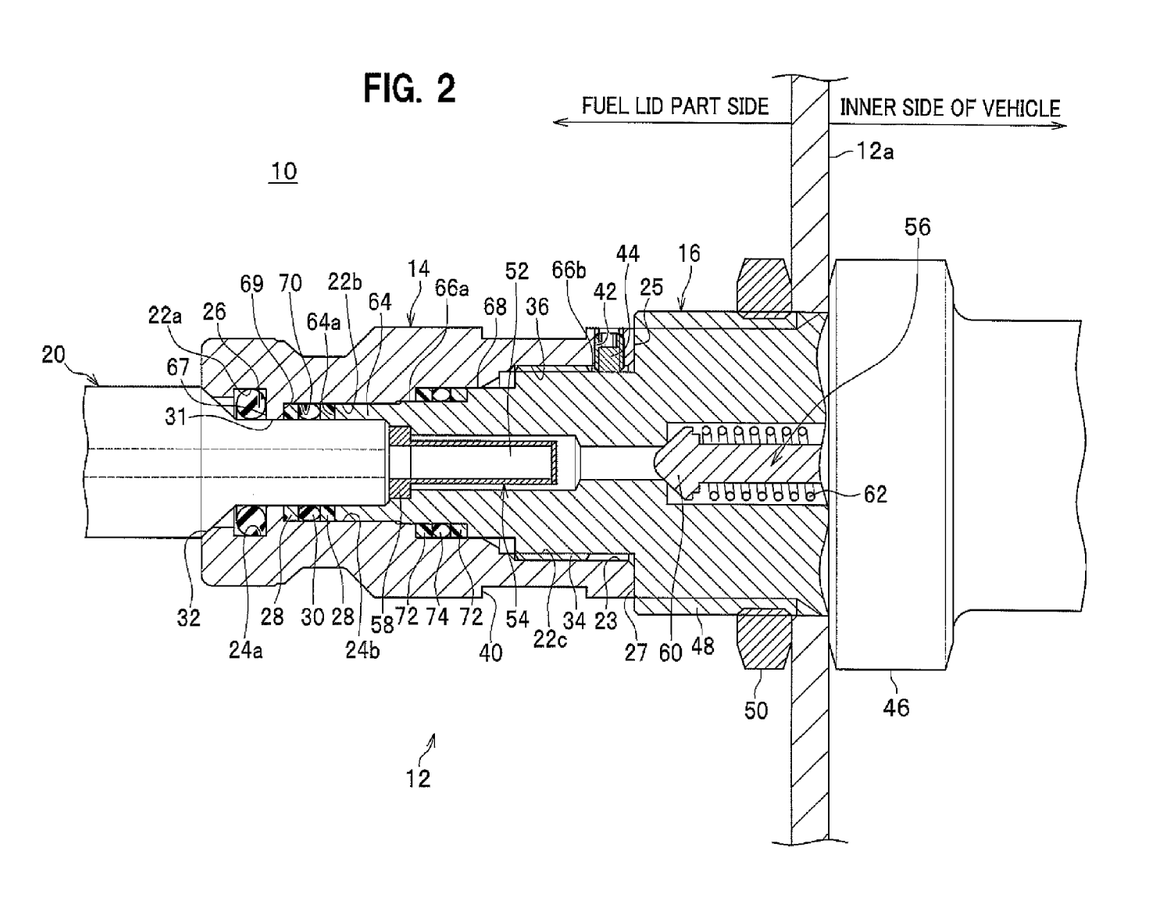
FIG. 2 is a vertical cross sectional view illustrating a state where a nozzle is inserted in the hydrogen gas filling port illustrated in FIG. 1.
Figure 3A:
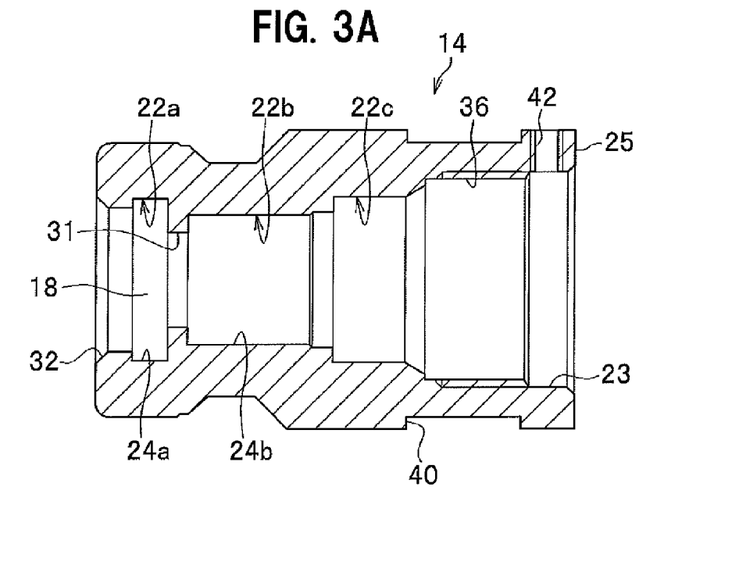
FIG. 3A is a vertical cross sectional view of a first body and FIG. 3B is a vertical cross sectional view of a second body.
Figure 3B:
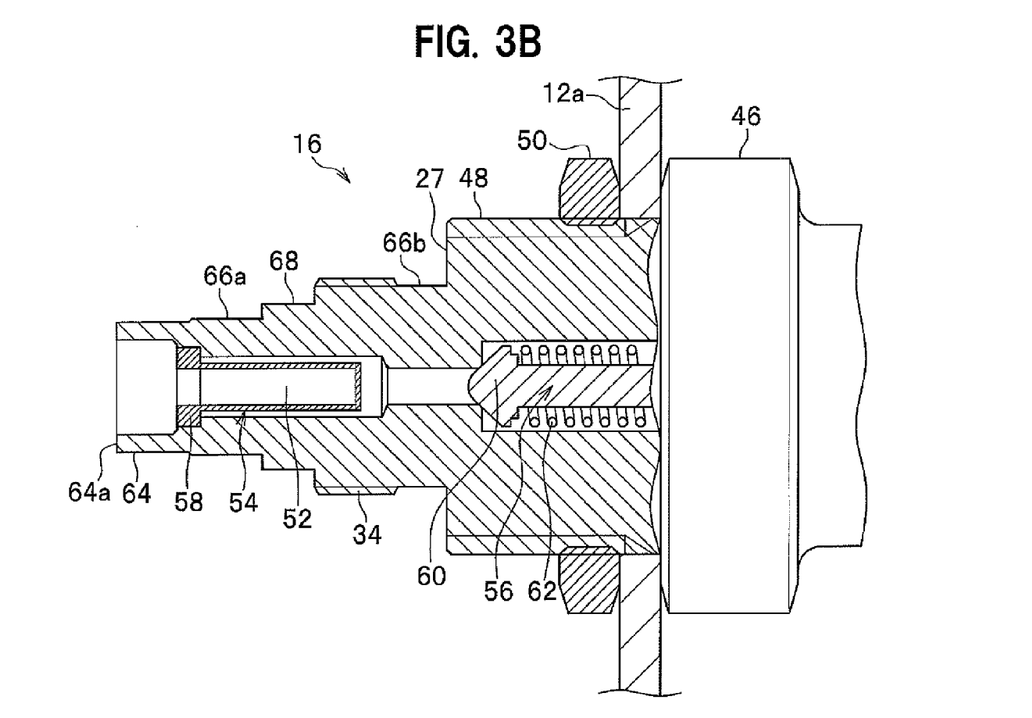
Figure 4:
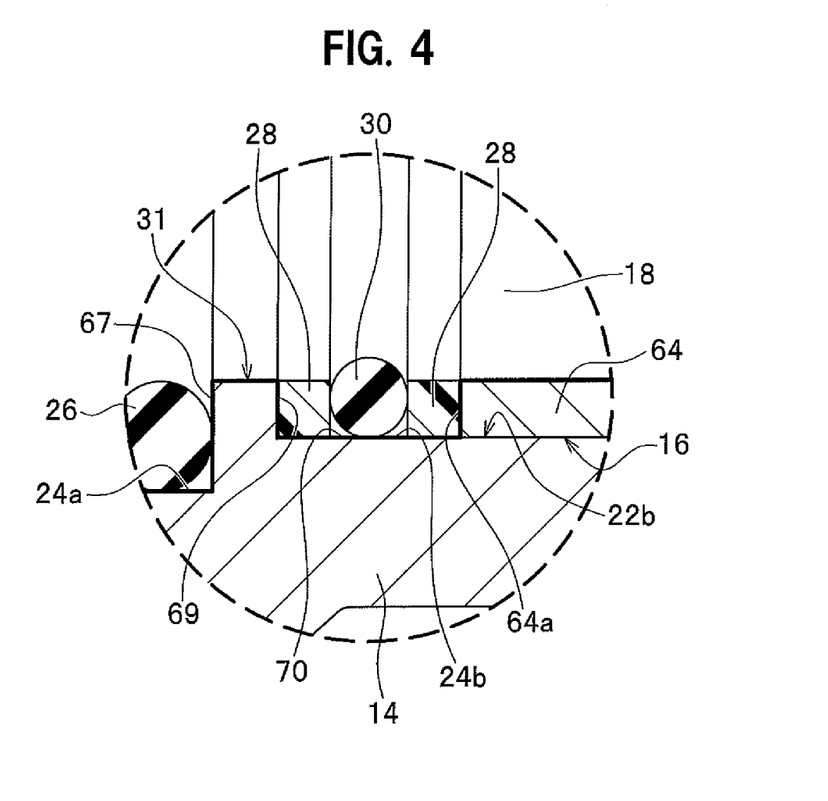
FIG. 4 is an enlarged cross sectional view of the portion A illustrated in FIG. 1.

FIG. 1 is a schematic structural cross sectional view of the hydrogen gas filling port according to an embodiment of the invention. FIG. 2 is a vertical cross sectional view illustrating a state where a nozzle is inserted in the hydrogen gas filling port illustrated in FIG. 1. FIG. 3A is a vertical cross sectional view of a first body and FIG. 3B is a vertical cross sectional view of a second body. FIG. 4 is an enlarged cross sectional view of the portion A illustrated in FIG. 1.

The hydrogen gas filling port 10 is provided, for example, at a fuel lid part 12 of the fuel cell automobile. As illustrated in FIG. 1, the hydrogen gas filling port 10 has a first body 14 and a second body 16 formed separately. The first body 14 and the second body 16 are assembled integrally along an axial direction respectively. "High pressure gas" defined, for example, in the High Pressure Gas Safety Act is used as the hydrogen gas (pressure fluid) filled to the hydrogen gas filling port 10.

As illustrated in FIGS. 1 and 3A, the first body 14 is an approximately cylindrical shape and has a first fluid channel 18 penetrating along the axial direction. A nozzle 20 is inserted in the first fluid channel 18 from an outside (see FIG. 2). The first fluid channel 18 has a first inner diameter part 22a and a second inner diameter part 22b respectively in an order that the inner diameter becomes smaller along the axial direction from a side where the nozzle 20 is inserted. A third inner diameter part 22c is formed from the second inner diameter part 22b of the first body 14 toward an opening part side through which the second body 16 is inserted. The third inner diameter part 22c includes a stepped part of an inner diameter side and is set to have a larger diameter than an inner diameter of the second inner diameter part 22b.

Seal assembly surfaces for assembling seal members are formed on an inner circumferential surface 24a of the first inner diameter part 22a and an inner circumferential surface 24b of the second inner diameter part 22b, respectively. A first O-ring 26 having a larger outer diameter is assembled on the inner circumferential surface 24a of the first inner diameter part 22a. A pair of backup rings 28, 28 and a second O-ring 30 are assembled on the inner circumferential surface 24b of the second inner diameter part 22b along the axial direction of the second inner diameter part 22b, respectively. The second O-ring 30 has a smaller diameter and is sandwiched between the pair of backup rings 28, 28.

The inner circumferential surface 24b of the second inner diameter part 22b is set to have the smallest inner diameter among the inner diameter parts of the first body 14 and does not have any obstacles at the opening part 23 side. Therefore, as described later, the pair of backup rings 28, 28 and the second O-ring 30 can be easily assembled on the inner circumferential surface 24b of the second inner diameter part 22b from the opening part 23 side (see FIG. 5A).

An annular projection part 31 which extends from each of the inner circumferential surfaces 24a, 24b and projects toward an inner diameter side is provided between the first inner diameter part 22a and the second inner diameter part 22b. An inner diameter of the annular projection part 31 is formed smaller than the first inner diameter part 22a and the second inner diameter part 22b. As illustrated in FIG. 4, a sealing groove in which the first O-ring 26 is held is formed by a wall surface 67 which faces a wall surface 69 of the annular projection part 31 and the inner circumferential surface 24a. Further, a sealing groove 70 in which the pair of backup ring 28, 28 and the second O-ring 30 are held is formed by the wall surface 69 which faces the wall surface 67 of the annular projection part 31, an end surface 64a of a tip part 64 of the second body 16, and the inner circumferential surface 24b, as described later.

As illustrated in FIG. 1 and FIG. 3A, an insertion opening part 32 for the nozzle 20 is formed at one end along the axial direction of the first body 14. The insertion opening part 32 is formed continuously to the first fluid channel 18. The opening part 23 is formed through which the second body 16 is inserted at the other end along the axial direction of the first body 14. An end surface 25 of the first body 14 having the opening part 23 abuts on an annular side wall 27 (also see FIG. 3B) of the second body 16 to form a divisional surface between the first body 14 and the second body 16.

A female screw 36 is formed on an inner circumferential surface of the first body 14 which is adjacent to the opening part 23. The female screw 36 is screwed with a male screw 34 (described later) formed on an outer circumference of the second body 16. The female screw 36 functions as a first body fixing part.

Further, a tool engaging part 40 is formed on an outer circumference of the first body 14. The tool engaging part 40 has a concave portion having an approximately rectangular shape in cross section which recesses toward the inner diameter side compared with other outer circumferential surfaces nearby. For example, the tool engaging part 40 is formed by a two-plane facing each other or a hexagonal surface or the like which continues annularly. The tool engaging part 40 is retained by a specialized tool (not illustrated) when the second body 16 is separated from the first body 14.

A penetrating bore 42 which is perpendicular to the axial direction and penetrates the first body 14 in a radial direction is formed at the other end side of the first body 14. A locking screw member (locking member) 44 which is screwed via a screw part is provided in the penetrating bore 42. The locking screw member 44 is a set screw having a screw groove on the head thereof. The locking screw member 44 is screwed in the penetrating bore 42 and a tip surface of the locking screw member 44 abuts on an outer circumferential surface of the second body 16 to lock the second body 16. A locking pin member (not illustrated) may be forcibly inserted in the penetrating bore 42 in place of the locking screw member 44.

As illustrated in FIG. 1 and FIG. 3B, an annular convex part 46 is provided on the outer circumference of the second body 16. The annular convex part 46 projects outward in the radial direction compared with other outer circumferences. A bottom wall 12a of the fuel lid part 12 is sandwiched between an attaching nut 50 which fits with a screw part 48 formed on the outer circumference of the second body 16 and the annular convex part 46. In this case, an inner side of the vehicle (an inner side of the pressure fluid utilization apparatus) and the fuel lid part 12 side are partitioned based on the bottom wall 12a of the fuel lid part 12 as a boundary (see FIG. 1). The annular convex part 46, the screw part 48 and the attaching nut 50 function as a second body fixing part which fixes the vehicle (pressure fluid utilization apparatus) and the hydrogen gas filling port 10.

A second fluid channel 52 is formed inside the second body 16. When the second body 16 is combined with the first body 14, the second fluid channel 52 communicates with the first fluid channel 18. A filter 54 which removes dust and the like contained in the hydrogen gas and a check valve 56 which can seal the hydrogen gas supplied from the first fluid channel 18 are arranged in the second fluid channel 52 in an order from a side adjacent to the first fluid channel 18.

The filter 54 is a bottomed cylindrical body and is held in an annular stepped part in the second fluid channel 52 by an annular flange part 58 provided at an opposite side of a bottomed part. The check valve 56 has a valve body 60 and a spring member 62. The valve body 60 has a tapered surface which contacts on a contacting part provided on the stepped part of the second fluid channel 52. The spring member 62 is a coil spring which biases the valve body 60 toward the contacting part.

In this case, the check valve 56 is a normally-closed type in which the valve body 60 contacts on the contacting part to be in a closed valve state in a normal period. For example, when the first body 14 and the second body 16 are disassembled, leakage of the hydrogen gas from an inside to an outside which directs from the check valve 56 side to the filter 54 side in the second fluid channel 52 of the second body 16 is cut off. Further, when the valve body 60 of the check valve 56 is pressed by the high-pressure hydrogen gas supplied from the first fluid channel 18 and when the hydrogen gas overcomes spring force of the spring member 62 so that the valve body 60 is separated from the contacting part, the check valve 56 is brought into an open valve state. Thus, the hydrogen gas flows from the first fluid channel 18 in an inner side direction of the vehicle via the second fluid channel 52.

The outer circumference of the second body 16 has the tip part 64, a first outer diameter part 66a which has an outer diameter to be inserted in the second inner diameter part 22b and continues from the tip part 64, and a second outer diameter part 66b which continues to the first outer diameter part 66a via a stepped part 68 in an order that a diameter becomes larger from the first fluid channel 18 side. The male screw 34 which is screwed with the female screw 36 on the first body 14 side is formed on an outer circumference of a second outer diameter part 66b.

In this case, when the tip part 64 of the second body 16 is inserted in the first fluid channel 18 of the first body 14, the sealing groove 70 is formed. The sealing groove 70 accommodates the pair of backup rings 28, 28 and the second O-ring 30. Further, the sealing groove 70 is formed by the wall surface 69 which is provided at the end along the axial direction of the second inner diameter part 22b, the end surface 64a of the tip part 64 of the second body 16, and the inner circumferential surface 24b of the second inner diameter part 22b (see FIG. 4).

The sealing groove 70 is an annular groove having a rectangular shape in cross section and is not formed yet as the sealing groove 70 before the tip part 64 of the second body 16 is inserted in the first fluid channel 18 of the first body 14. Therefore, the pair of backup rings 28, 28 and the second O-ring 30 can be easily assembled on the inner circumferential surface 24b of the first body 14 (seal assembly surface) as described later. An assembly operation for these seal members will be explained in detail later.

The other pair of backup rings 72, 72 and the other O-ring 74 sandwiched between the other pair of backup rings 72, are provided between the inner circumference of the first body 14 and the outer circumference of the second body 16. The other pair of backup rings 72, 72 and the other O-ring 74 function to seal a linking portion of the first body 14 and the second body 16.

The hydrogen gas filling port 10 of the embodiment is basically structured above. Effects thereof will be explained below.

Figure 5A:
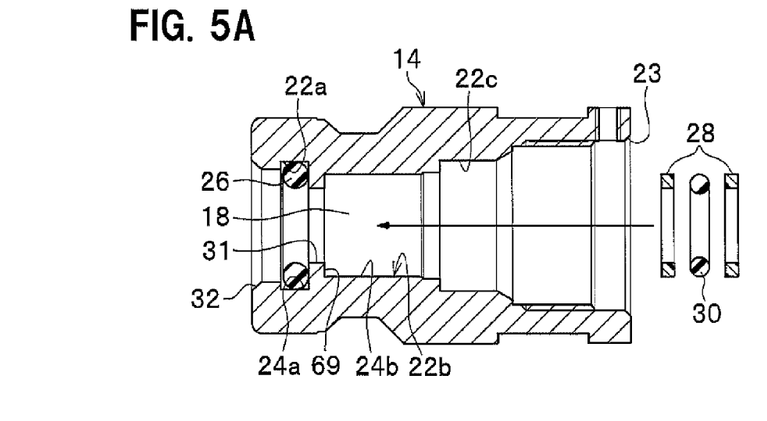
FIG. 5A and FIG. 5B are vertical cross sectional views illustrating an assembly process of the hydrogen gas filling port.
Figure 5B:
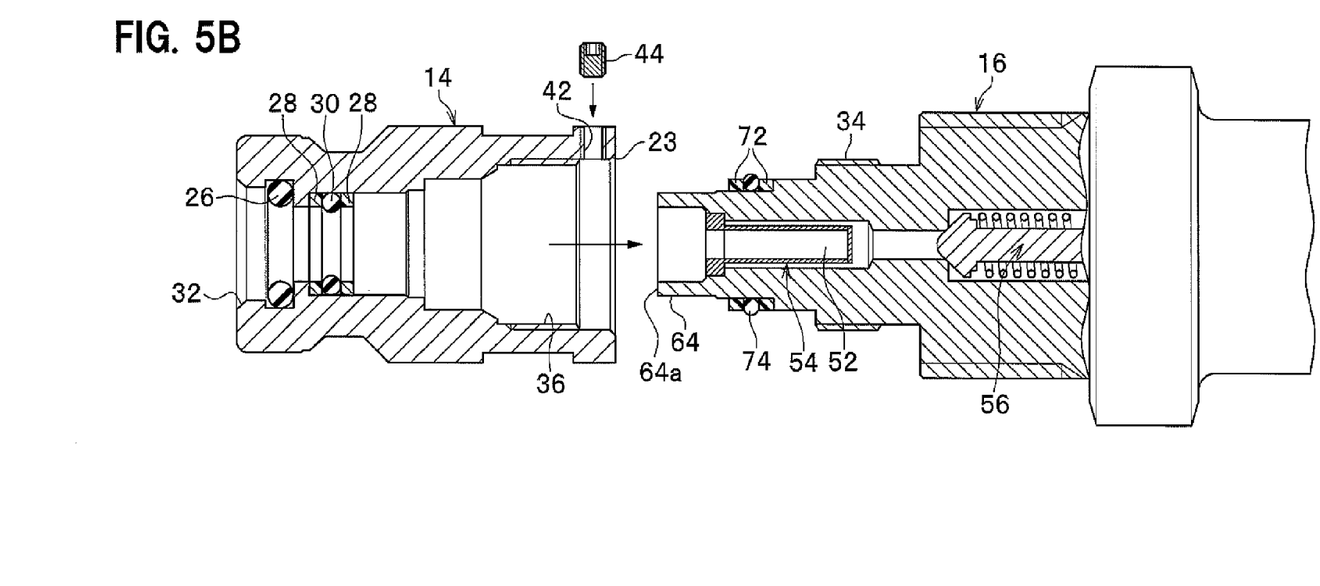

The assembly operation for the hydrogen gas filling port 10 will be explained. FIGS. 5A and 5B are vertical cross sectional views illustrating the assembly operation for the hydrogen gas filling port 10. In FIG. 5A, the first O-ring 26 is assembled beforehand on the inner circumferential surface 24a of the first inner diameter part 22a from the insertion opening part 32.

As illustrated in FIG. 5A, the pair of backup rings 28, 28 and the second O-ring 30 are assembled on the inner circumferential surface 24b of the second inner part 22b of the first body 14 respectively. In this case, the inner circumferential surface 24b of the second inner diameter part 22b of the first body 14 is set as the smallest inner diameter among the inner diameter parts of the first body 14, seen from the opening part 23 through which the second body 16 is inserted. Further, the annular projection part 31 positions at a back side of the inner circumferential surface 24b seen from the opening part 23 side and no obstacles are present at the opening part 23 side. Therefore, the pair of backup rings 28, and the second O-ring 30 can be easily assembled on the inner circumferential surface 24b of the second inner diameter part 22b from the opening part 23 side.

After the pair of backup rings 28, 28 and the second O-ring 30 are mounted on the inner circumferential surface 24b of the second inner diameter part 22b, as illustrated in FIG. 5B, the tip part 64 of the second body 16 is inserted from the opening part 23 side of the first body 14, and the male screw 34 on the second body 16 side is screwed with the female screw on the first body 14 side. Thus, the first body 14 is assembled with the second body 16 integrally.

In this state, the end surface 64a of the tip part 64 of the second body 16 abuts on the backup ring 28 which is assembled on the inner circumferential surface 24b. The sealing groove 70 is formed by the wall surface 69 of the annular projection part 31 which is provided at the end of the second inner diameter part 22b along the axial direction, the end surface 64a of the tip part 64 of the second body 16, and the inner circumferential surface 24b of the second inner diameter part 22b. The sealing groove 70 accommodates the pair of backup rings 28, 28 and the second O-ring 30 (see FIG. 4). In other words, the pair of backup rings 28, 28 and the second O-ring 30 are sandwiched between the wall surface 69 of the annular projection part 31 of the first body 14 and the end surface 64a of the tip part 64 of the second body 16. Therefore, the pair of backup rings 28, 28 and the second O-ring 30 can be prevented from falling off and can be kept in a state that a sealing function can be exerted stably without biting and the like.

Further, the locking screw member 44 is screwed in the penetrating bore 42 which is perpendicular to the axial direction of the first body 14. Accordingly, the linking portion of the first body 14 and the second body 16 is locked. When the pair of backup rings 28, 28 and the second O-ring 30 need to be taken off for maintenance or the like, reverse procedures of the above description are carried out.

In the embodiment, by forming the first body 14 and the second body 16 separately, the assembly operation and the disassembly operation for the seal members in the second inner diameter part 22b of the first body 14 can be easily achieved. Therefore, an assembly property can be improved and an assembling time and an exchange time can be shortened. As a result, the embodiment can reduce a manufacturing cost.

In the embodiment, the inner diameter of the third inner diameter part 22c extending from an end of the second inner diameter part 22b of the first body 14 toward the opening part 23 side is made larger than the inner diameters of the second inner diameter part 22b and the stepped part 68. Therefore, the pair of backup rings 28, 28 and the second O-ring 30 can be assembled on the inner circumferential surface 24b of the second inner diameter part 22b without making the diameters thereof smaller.

Figure 7B:
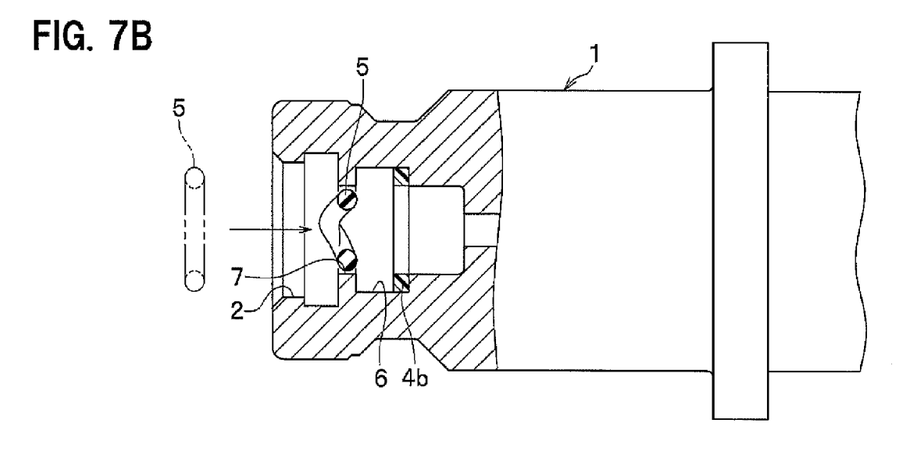
FIG. 7B is a cross sectional view illustrating a state where the O-ring illustrated in FIG. 7A is deformed to be assembled at the back of an insertion port.

On the other hand, for example, in the hydrogen filling port for a car described in SAE J2799, as illustrated in FIG. 7B, when the second O-ring 5 and the backup rings 4a, 4b are assembled in the fixing groove 6, the inner diameter of the annular partition 7 is formed smaller than the outer diameter of the second O-ring 5. Therefore, the second O-ring 5 and the like need to be deformed (reduced in diameter) for assembly (see solid line in FIG. 7B). The assembly operation becomes bothersome and a user needs to work carefully so as not to abrade the second O-ring 5, and thereby an assembly time becomes longer.

In the embodiment, the pair of backup rings 28, 28 and the second O-ring 30 etc. can be assembled on the seal assembly surface without deforming them (see FIG. 5A). Since the seal members can be formed with, for example, hard material having high strength, the seal members can be formed with various material and degree of freedom for the seal members can be expanded.

Further, in the embodiment, a position of the divisional surface between the first body 14 and the second body 16 is set at a front side of the fuel lid part 12 with respect to a fastening position where the bottom wall 12a is sandwiched between the attaching nut 50 and the annular convex part 46 (see FIG. 1). Thus, when the second O-ring 30 and the pair of backup rings 28, 28 are exchanged for new members, the exchange operation for seal members can be carried out in an onboard state (state in which the hydrogen gas filling port 10 is assembled on the stationary type apparatus) where a fuel lid cover (not illustrated) is opened.

Further, in the embodiment, a position of the tool engaging part 40 is set at a position apart from the insertion opening part 32 and of the front side of the divisional surface. Further, the shape of the tool engaging part 40 is set as the concave portion having an approximately rectangular shape in cross section which recesses toward the inner diameter side compared with other outer circumferential surfaces nearby. Therefore, the specialized tool is needed to retain the tool engaging part 40 in the onboard state for disassembling the first body 14 and the second body 16. Thus, the structure is difficult to be disassembled by an end user. Further, the second body 16 is locked by the locking screw member 44 which is screwed in the penetrating bore 42 perpendicular to the axial direction. Therefore, the disassembly of the first body 14 and the second body 16 can be prevented and seal defect due to improper assembly by the end user can be avoided.

Still further, in the embodiment, the filter 54 is arranged in the second fluid channel 52 between an opening part of the tip part 64 of the second body 16 and the check valve 56. Therefore, when the first body 14 and the second body 16 are disassembled, the valve body 60 of the check valve 56 contacts on the contacting part to prevent the hydrogen gas from leakage to the outside. This avoids waste of the hydrogen gas and preferably prevents the valve body 60 of the check valve 56 from being attached with foreign materials. Also, the check valve 56 can be prevented from being touched by an operator carelessly when the first body 14 and the second body 16 are disassembled (detached).

Yet further, in the embodiment, the filter 54 is arranged at the position where the filter 54 is easily detachable from the tip part 64 side of the second body 16 after the first body 14 is disassembled. Therefore, the filter 54 can be easily exchanged and cleaned and maintainability in the onboard state can be improved.

A hydrogen gas filling port 10a according to the other embodiment of the invention will be explained. The same structure elements as those of the hydrogen gas filling port 10 illustrated in FIG. 1 are labeled with the same reference numbers and the explanation thereof will be omitted.

Figure 6:
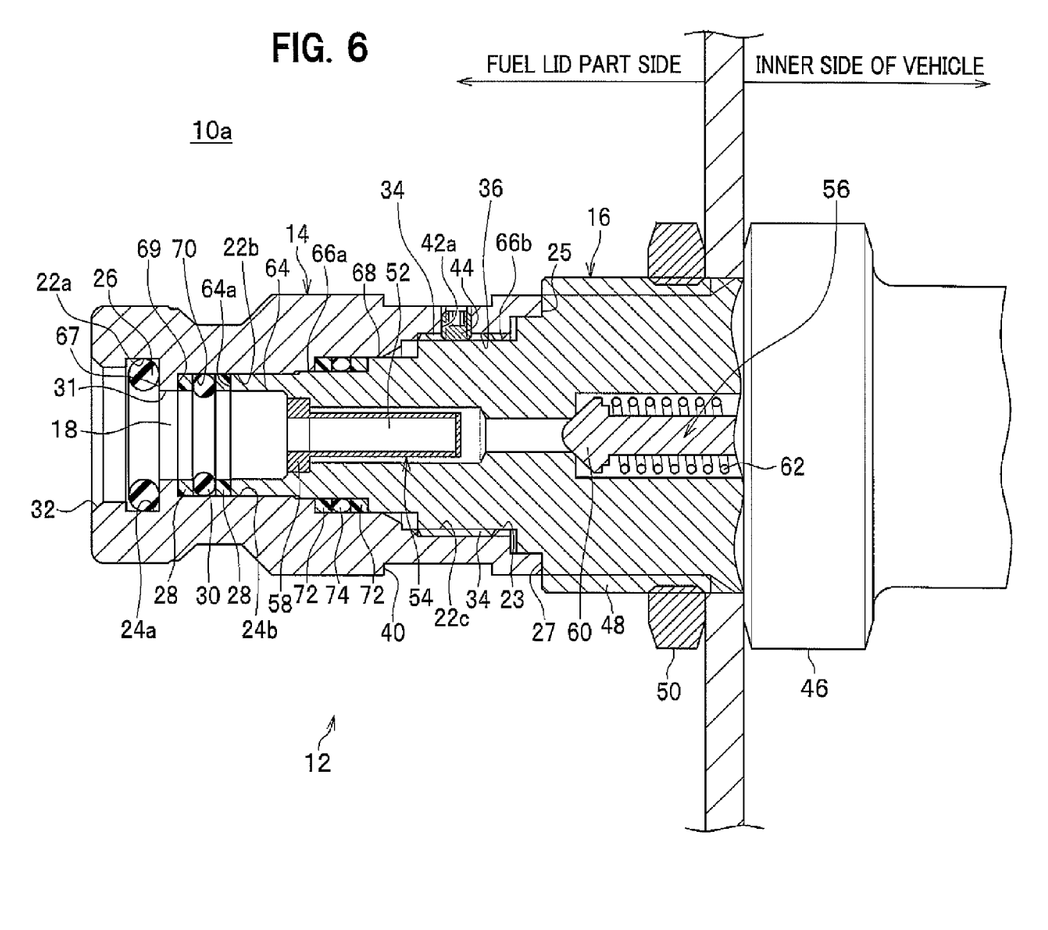
FIG. 6 is a schematic structural cross sectional view of a hydrogen filling port according to the other embodiment of the invention.

FIG. 6 is a schematic structural cross sectional view of a hydrogen filling port according to the other embodiment of the invention.

The hydrogen gas filling port 10a according to the other embodiment is different from the embodiment illustrated in FIG. 1 in that a penetrating bore 42a is provided which penetrates the female screw 36 formed on the inner wall of the first body 14 radially and in that the locking screw member (locking member) 44 which locks the second body 16 is provided in the penetrating bore 42a.

In the hydrogen gas filling port 10a, the locking screw member 44 which is screwed in the penetrating bore 42a partially breaks the male screw 34 which fastens the first body and the second body 16 integrally. This leads to a structure which the end user cannot disassemble the first body 14 and the second body 16. Other effects are the same as those of the hydrogen gas filling port 10 illustrated in FIG. 1 and the explanation thereof will be omitted.

EXPLANATION OF REFERENCES 10, 10a hydrogen gas filling port
14 first body
16 second body
18 first fluid channel
20 nozzle
22a to 22c inner diameter part
24a, 24b inner circumferential surface
26, 30 O-ring (seal member)
34 male screw
36 female screw (first body fixing part)
40 tool engaging part (concave portion for tool engagement)
42, 42a penetrating bore
44 locking screw member (locking member)
46 annular convex part (second body fixing part)
48 screw part (second body fixing part)
50 attaching nut (second body fixing part)
52 second fluid channel
54 filter
56 check valve
64 tip part
64a end surface
66a, 66b outer diameter part
69 wall surface
70 sealing groove

The invention claimed is:

1. A filling port structure for pressure fluid that is provided on a pressure fluid utilization apparatus, the filling port structure having a pair of a first body and a second body, the second body being formed separately from the first body, wherein
the first body includes a first fluid channel in which a nozzle is inserted from an outside of the pressure fluid utilization apparatus,
the first fluid channel has a first inner diameter part and a second inner diameter part in an order that an inner diameter becomes smaller from a side where the nozzle is inserted;
the first inner diameter part and the second inner diameter part have inner circumferential surfaces on which seal assembly surfaces are formed, respectively;
the second body has a second fluid channel that is capable of communicating with the first fluid channel when the second body is combined with the first body, and has a second body fixing part that fixes the pressure fluid utilization apparatus and the filling port;
the second body has a first outer diameter part and a second outer diameter part that have outer diameters inserted in the second inner diameter part and that are successive from a tip part in an order that a diameter becomes larger from the first fluid channel side; and
a wall surface that is provided at an end along an axial direction of the second inner diameter part, an end surface of the tip part of the second body and an inner circumferential surface of the second inner diameter part form a sealing groove when the tip part of the second body is inserted in the first fluid channel.

2. The filling port structure for pressure fluid according to claim 1, wherein the first body has a first body fixing part that positions outside the pressure fluid utilization apparatus with respect to the second body fixing part when the first body is combined with the second body.

3. The filling port structure for pressure fluid according to claim 2, wherein the first body has a concave portion for engaging a tool on an outer circumference at one end side apart from the side where the nozzle is inserted.

4. The filling port structure for pressure fluid according to claim 2, wherein the first body fixing part is a female screw that is screwed with a male screw formed on an outer circumference of the second body, a penetrating bore that penetrates the female screw in a radial direction is formed in the first body fixing part, and a locking member that locks the second body is provided in the penetrating bore.

5. The filling port structure for pressure fluid according to claim 1, wherein the second fluid channel includes a filter and a check valve that can seal the pressure fluid supplied from the first fluid channel in an order from a side adjacent to the first fluid channel.

\* \* \* \* \*